Feb. 2, 1954   J. C. TUSTING ET AL   2,667,981
CONVEYER AND TRANSFER APPARATUS FOR THE DRYING OF LEATHER
Filed June 19, 1950   11 Sheets-Sheet 1

INVENTORS
JOHN CHARLES TUSTING
AND GEORGE OVERSTALL
By Linton and Linton
ATTORNEYS

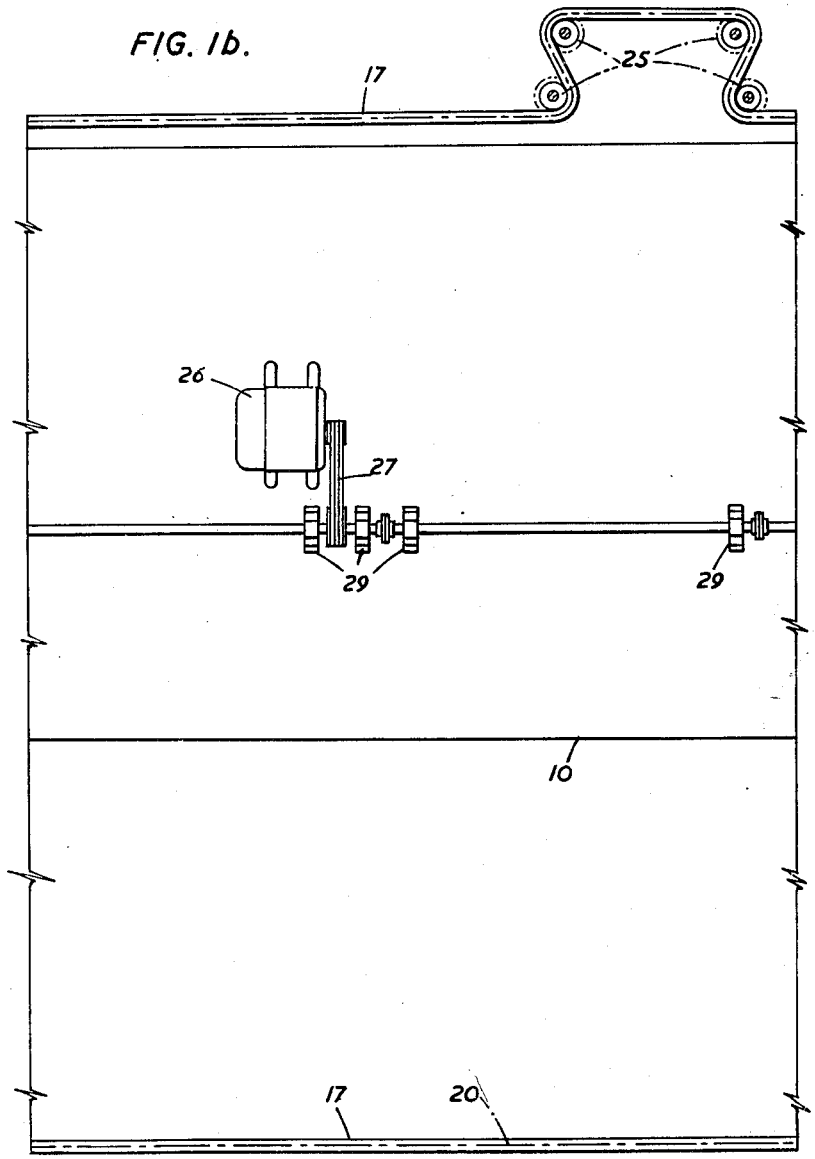

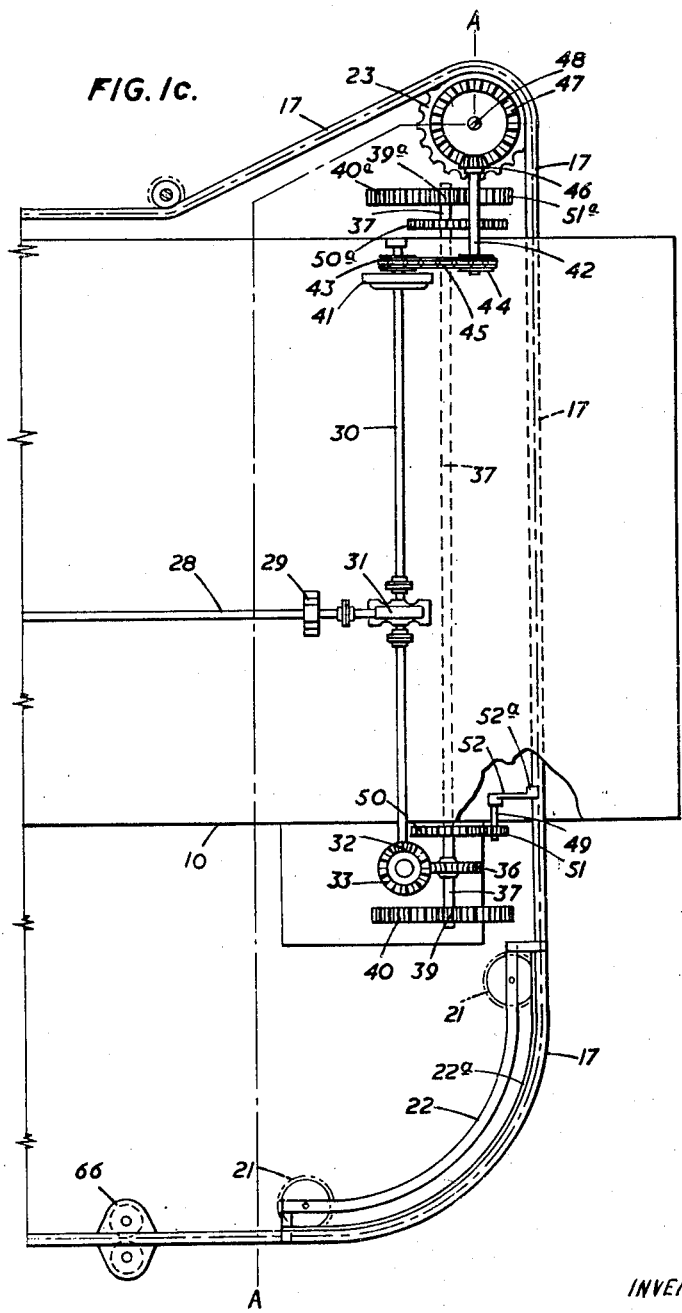

Feb. 2, 1954   J. C. TUSTING ET AL   2,667,981
CONVEYER AND TRANSFER APPARATUS FOR THE DRYING OF LEATHER
Filed June 19, 1950   11 Sheets-Sheet 4

INVENTORS
JOHN CHARLES TUSTING
AND GEORGE OVERSTALL
By Linton and Linton
ATTORNEYS

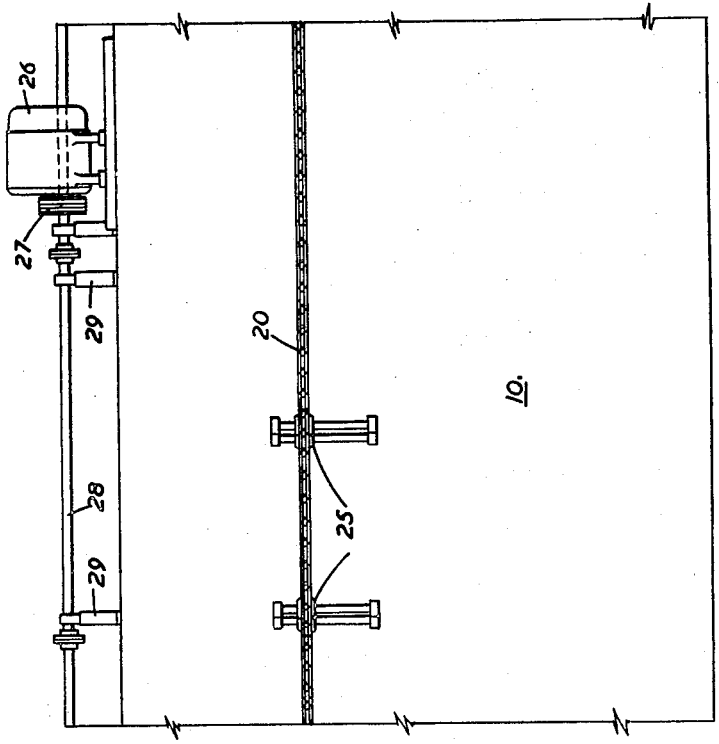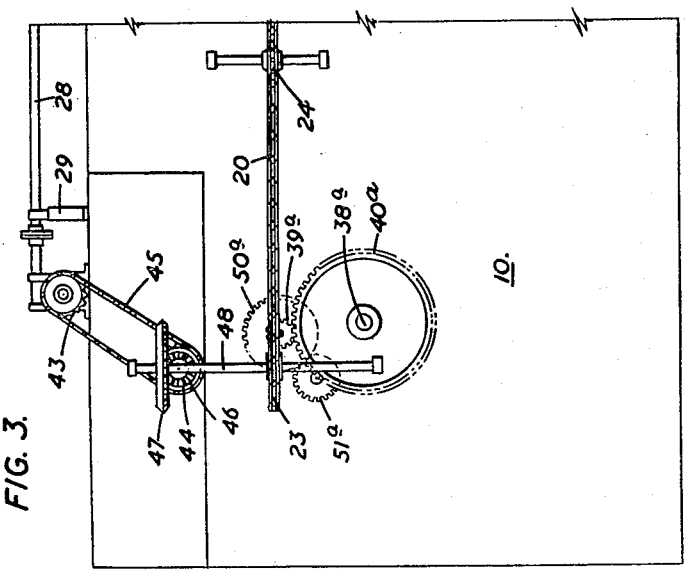
FIG. 3.

Feb. 2, 1954 J. C. TUSTING ET AL 2,667,981
CONVEYER AND TRANSFER APPARATUS FOR THE DRYING OF LEATHER
Filed June 19, 1950 11 Sheets-Sheet 6
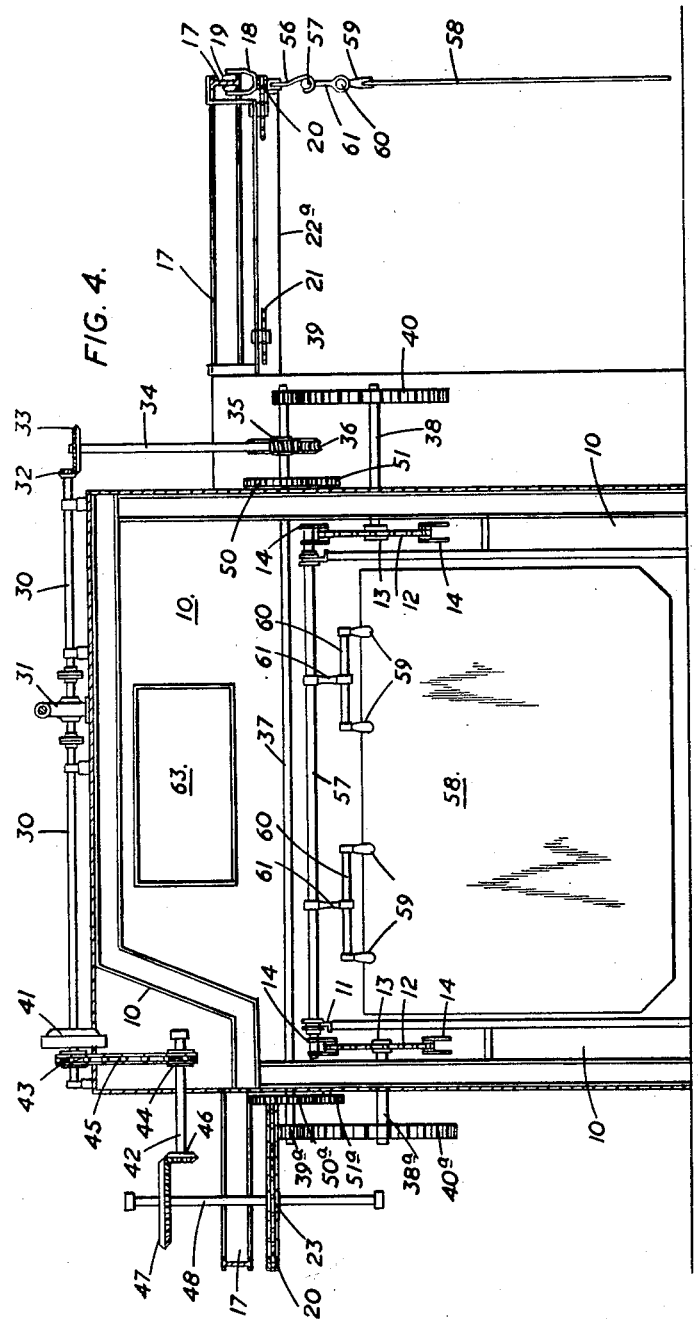
INVENTORS
JOHN CHARLES TUSTING AND
GEORGE OVERSTALL
By Linton and Linton
ATTORNEYS Feb. 2, 1954     J. C. TUSTING ET AL     2,667,981
CONVEYER AND TRANSFER APPARATUS FOR THE DRYING OF LEATHER
Filed June 19, 1950     11 Sheets-Sheet 7
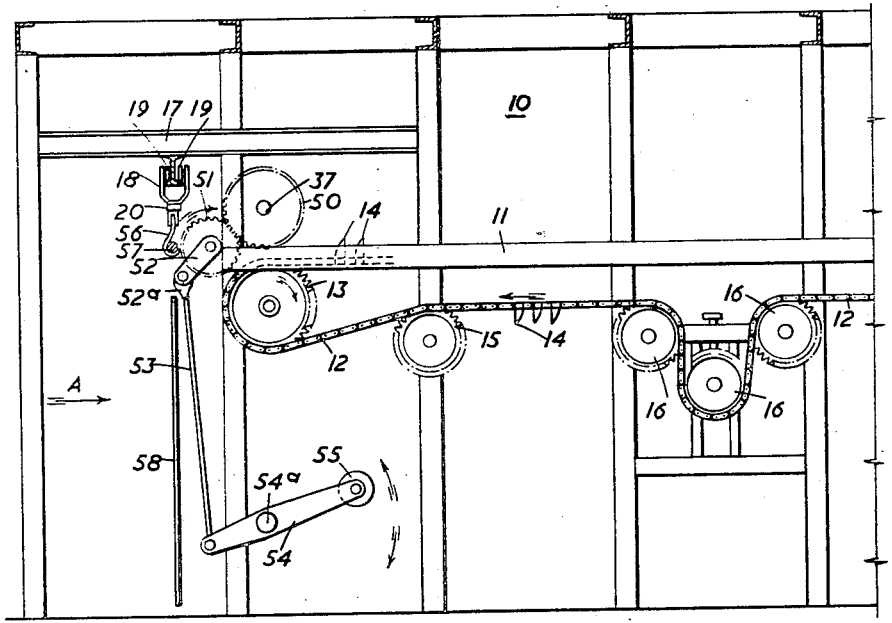
INVENTORS
JOHN CHARLES TUSTING AND
GEORGE OVERSTALL
By Linton and Linton
ATTORNEYS Feb. 2, 1954   J. C. TUSTING ET AL   2,667,981
CONVEYER AND TRANSFER APPARATUS FOR THE DRYING OF LEATHER
Filed June 19, 1950   11 Sheets-Sheet 8
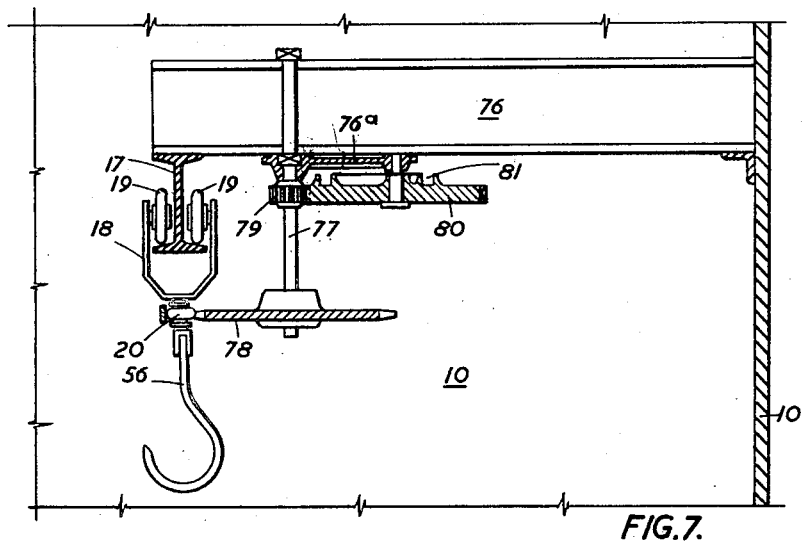
FIG.7.
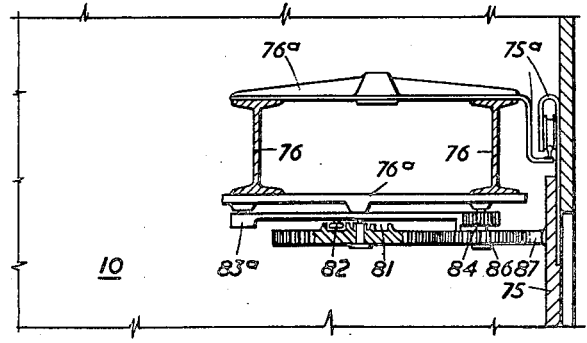
FIG.8.
FIG.9.
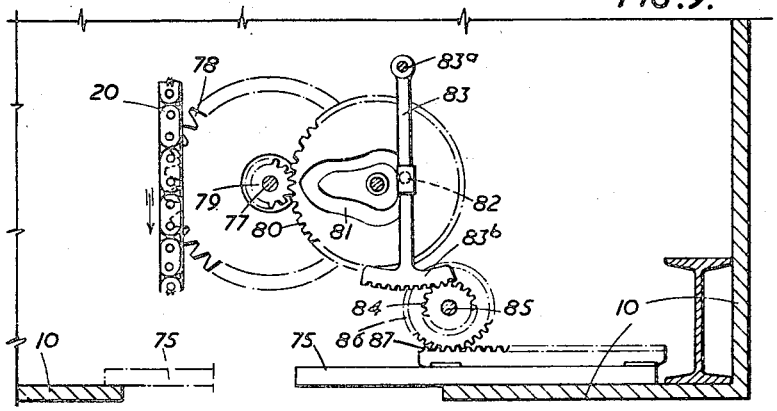
INVENTORS
JOHN CHARLES TUSTING AND
GEORGE OVERSTALL
By Linton and Linton
ATTORNEYS Feb. 2, 1954   J. C. TUSTING ET AL   2,667,981
CONVEYER AND TRANSFER APPARATUS FOR THE DRYING OF LEATHER
Filed June 19, 1950   11 Sheets-Sheet 10

INVENTORS
JOHN CHARLES TUSTING AND
GEORGE OVERSTALL
By Linton and Linton
ATTORNEYS Feb. 2, 1954   J. C. TUSTING ET AL   2,667,981
CONVEYER AND TRANSFER APPARATUS FOR THE DRYING OF LEATHER
Filed June 19, 1950   11 Sheets-Sheet 11

INVENTORS
JOHN CHARLES TUSTING
AND GEORGE OVERSTALL
By Linton and Linton
ATTORNEYS Patented Feb. 2, 1954

2,667,981

UNITED STATES PATENT OFFICE 2,667,981

CONVEYER AND TRANSFER APPARATUS FOR THE DRYING OF LEATHER

John Charles Tusting, Harrold, Bedford, and George Overstall, Stubbins, Ramsbottom, England Application June 19, 1950, Serial No. 168,868

Claims priority, application Great Britain June 24, 1949

10 Claims. (Cl. 214—21)

This invention relates to the drying of leather, and more especially to the drying of hides or skins (all hereinafter, for convenience of description only, included in the term "skin" or "skins") during the conventional processing of same subsequent to tannage, and has for its object to provide apparatus which is continuous in operation and in the working thereof to confine manual labour solely to the attachment of wet, and removal of dry, skins from carrier panels or frames.

Hitherto, in the drying of skins, so far as we are aware, it has been customary for wet skins carried on panels or frames to proceed by mechanical actuation through a drying chamber, the removal of each panel, in turn, from said chamber—for the purpose of stripping a dry skin therefrom and reloading with a wet skin—and subsequent return of the panel to the chamber has been effected by hand, with consequential wasteful expenditure of time and labour.

Leather drying apparatus, according to our invention, broadly comprises a drying chamber; a conveyor within said chamber adapted for continuous movement therethrough at required speed whereby panels or frames loaded with skins are propelled through the chamber for drying; a second conveyor which is external to said drying chamber in its longitudinal run, but passes transversely through each end of the chamber, and which is adapted for automatically controlled intermittent movement; means at an end—hereinafter referred to as the "unloading end"—of said chamber whereby panels, carrying dried skins, are transferred automatically, one at a time, from the internal to the external conveyor; and similar means at the other end (hereinafter referred to as the "loading end") of said chamber whereby panels which have been hand stripped of dried skins and reloaded with wet skins are transferred automatically from said external conveyor onto the internal conveyor.

It is preferred to use carrier panels of glass whereto wet skins may be attached by a suitable adhesive, but other types of carrier means, such, for example, as wire-mesh frames to which the skins are secured by toggles, may be utilized if desired.

According to one mode of carrying out our invention, each panel is flexibly suspended from a main overhead bar or pole associated through links and secondary suspension bars with clamps having bolt connections through bolt holes provided adjacent the top edge of the panel. Said main suspension bar is provided with flanged runners adapted to engage and travel on a pair of track rails disposed one at each side of the drying chamber, which latter is a steel-framed structure of substantially rectangular cross section, the side, end, and top walls whereof are panelled with insulating material. An endless chain supported on end sprockets and intermediate tracks runs along each interior side of said chamber and at regular intervals is provided with projecting horns, or other attachments, adapted to engage with the ends of said main panel-suspension bars and thus draw or propel said panels through the chamber on the before mentioned runners. Heated, and preferably conditioned, air is circulated through the drying chamber by means of appropriately positioned fans. Said external conveyor consists of an overhead runway wherefrom is suspended an endless chain fitted with spaced pairs of carrier hooks adapted to receive and hold a main panel-suspension bar.

The cycle of operations of said apparatus, is such that a panel with wet skins is transferred at the loading end from the external conveyor into the drying chamber at the same time as a panel with dry skins is transferred at the unloading end from the drying chamber to the external conveyor, the latter becoming stationary to permit of the transferring operation, and there is thus obtained a continuous motion through the drying chamber, and a synchronised intermittent motion of the external conveyor which results in each panel in turn emerging from the chamber at the unloading end for the manual operation of the stripping therefrom of dry skins and the re-loading with wet skins, and the subsequent re-transfer of each panel into said chamber at the opposite or loading end, all operations being carried out automatically.

We will further describe our invention with the aid of the accompanying sheets of—more or less diagrammatic—drawings which illustrate, by way of example only and not of limitation, one mode of embodying same.

In said drawings:

Fig. 1b is a plan view of the medial section thereof.

Fig. 1c is a plan view of the opposite or unloading end and when these three views are combined together they illustrate in plan view the complete apparatus.

Fig. 3 is a rear elevation of its unloading end.

Fig. 4 is a cross-section taken as on line A—A, Fig. 1.

Fig. 5 is an elevation of the loading end of the apparatus, showing the means for transferring panels from the external conveyor onto the internal conveyor.

Fig. 6 is an end elevation of Fig. 5.

Fig. 7 is a fragmentary elevation of the means for operating the sliding doors of the dryer, drawn to an enlarged scale as compared with the preceding views.

Fig. 8 is a view taken at right angles to Fig. 7.

Fig. 9 is a plan view of Fig. 7.

In the various views parts have been omitted or broken away where necessary in order to provide for clear understanding of the invention.

Figure 1A:
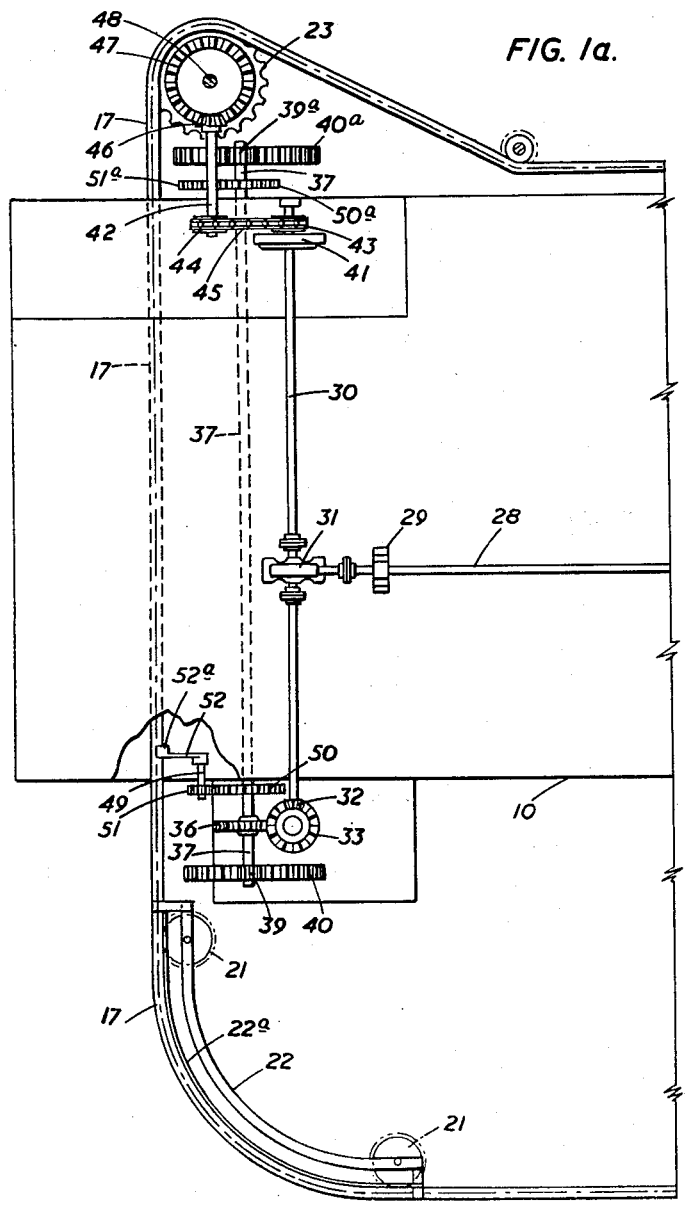
Fig. 1a illustrates in plan view the loading end of the apparatus.

Referring now to said drawings, 10 denotes a drying chamber of steel-framed construction, side, end, and top walls whereof are panelled with insulating material; and 11, 11 are a pair of track rails, disposed one at each interior side of said chamber. An endless chain 12, supported at each end on sprocket wheels 13 whereby it is driven, runs along each interior side of chamber 10 adjacent a track rail 11 and is provided at regular intervals with projecting horn attachments generally designated 14; jockey wheels 15 and tensioning gear 16 are provided in respect of each chain 12, on its return or non-working run. An overhead runway 17 runs externally along both sides of chamber 10 and passes through each end of same, as most clearly shown in Fig. 1; and suspended from said runway by brackets 18 with runners 19 is an endless chain 20, (the run of which is indicated in Fig. 1, by a chain-dot line). Jockey wheels 21 carried by rails 22 are provided together with a guide rail 22ª at each end to guide the chain in its travel into and out of the respective ends of chamber 10, and, on the opposite side of the chamber, chain 20 passes around driving sprockets 23, 23 disposed one adjacent each end of chamber 10, and around diversion wheels 24 and tensioning gear 25.

Mounted, in this instance, above drying chamber 10 on the roof thereof, is an electric motor 26 which is coupled medially, through a multi-belt drive 27, to a main transmission shaft 28 supported longitudinally above chamber 10 in bearings 29; and each end of shaft 28 drives a horizontal cross shaft 30 through worm reduction gear 31.

Considering now one end of the apparatus only—the other end being identical but for certain exceptions which are hereinafter described—one end of cross-shaft 30 is arranged to drive, through bevel wheels 32, 33 a vertical shaft 34 whereby, through a worm and wheel 35, 36, is driven a horizontal through shaft 37 which runs transversely of the upper portion of chamber 10 and extends outwardly from each side of same. Stub shaft 38, 38ª are driven by shaft 37 through spur gears 39, 40, and 39ª, 40ª respectively; and mounted on the inner ends of stub shafts 38, 38ª, are the before referred to driving sprockets 13 for internal conveyor chains 12. The drive from the other end of said cross shaft 30 is taken through a magnetic clutch 41 to a horizontal shaft 42 via sprockets 43, 44 and driving chain 45, said shafts 42 driving through bevel gears 46, 47 onto a vertical shaft 48: the latter carries driving sprocket 23 of the external runway chain 20. It will be seen from the foregoing that there is a constant drive from the motor 26 to the internal conveyor chains 12 of the drying chamber, but that the drive from motor 26, to the external conveyor chain 20 may be interrupted by means of clutches 41.

Also driven constantly by motor 26 via cross-shaft 30 are stub shafts 49, 49ª, the drive in this instance being through spur wheels 50, 50ª keyed to the before mentioned through shaft 37, and spur wheels 51, 51ª carried by stub shafts 49, 49ª respectively; the latter extend within chamber 10 and each has secured thereto a transfer arm 52 whereto is pivotally secured a cup-like member 52ª. Each cup member 52ª is connected by a rod 53 to one end of an arm 54 which is pivoted at 54ª and carries at its end remote from rod 53 a counterbalance weight 55.

Secured to certain pairs of suspension brackets 18 of the outer runway chain are pendant carrier hooks 56 adapted to receive main suspension bars 57 carrying panels 58, in this instance made of glass, whereto skins to be dried are affixed for a drying operation. Each glass panel 58 is flexibly suspended to its respective bar 57 by the aid of four clamp members 59 which are spacedly connected with the panel by bolts (not shown) passing through bolt holes provided therein adjacent its upper edge, two secondary suspension bars 60, and two links 61, as shown. Flanged runners 62 are rotatably mounted at each end of bar 57, being spaced one from the other in accordance with the distance between track rails 11 of the drying chamber 10, and the ends of bar 57 project for a short distance beyond said runners 62 for engagement—when the panel is within the drying chamber—with the horns 14 of conveyor chain 12.

In operation, and apart from the initial starting up and loading of the apparatus, drying chamber 10 is filled with panels 58 suspended from their bars 57, which, in turn, are supported by runners 62 on tracks 11, and horns 14 are disposed between each adjacent pair of bars 57 to propel the panels slowly and continuously through the chamber. The spacing between said panels is as close as is commensurate with the efficient circulation of heated and preferably conditioned air supplied to the chamber through a main duct 63 (Fig. 4) by conventional or other means.

With skins pasted thereonto in known manner, panels 58 are propelled continuously through chamber 10 at a speed determined by the speed of motor 26 and the ratios of the intermediate gears between the driving pulley of said motor and the driving sprockets 13 of conveyor chains 12—which ensures that the time taken for a panel to move through chamber 10 from the loading end to the unloading end is sufficient for the skins attached to said panel to be dried, and as each panel, in turn, arrives at the unloading end (Fig. 10) its suspension bar 57 moves clear of horns 14 of the conveyor chains 12, and runners 62 thereof move down shallow ramped portions 11ª of tracks 11 until they rest against stops 11ᵇ formed at the end of said tracks 11. Said stops 11ᵇ locate bar 57 in exact position for picking up by cup-like members 52ª on arms 52.

In order to prevent uncontrolled gravitational movement of a suspended panel when its runners reach ramped portions 11ª of tracks 11, there is provided, in respect of each track, and arm 64 pivoted at 64ª to said track and supported adjacent its free end by the plunger 65ª of a hydraulic shock absorber or dash-pot 65. Thus, as runners 62 of each panel reach the ramped portions of tracks 11 they bear upon said arms 64 which move downward against the retarding influence of plungers 65ª, and panel suspension bar 57 abuts gently on the horn attachments 14 immediately in front of it. As chains 12 move over sprockets 13, said horns 14 exert a retarding influence upon the suspended panel, and runners 62 thereof come to rest without shock against the runners 62 of the preceding panel which are in abutment with stop portions 11ᵇ of tracks 11 in take-off position.

Figure 10:
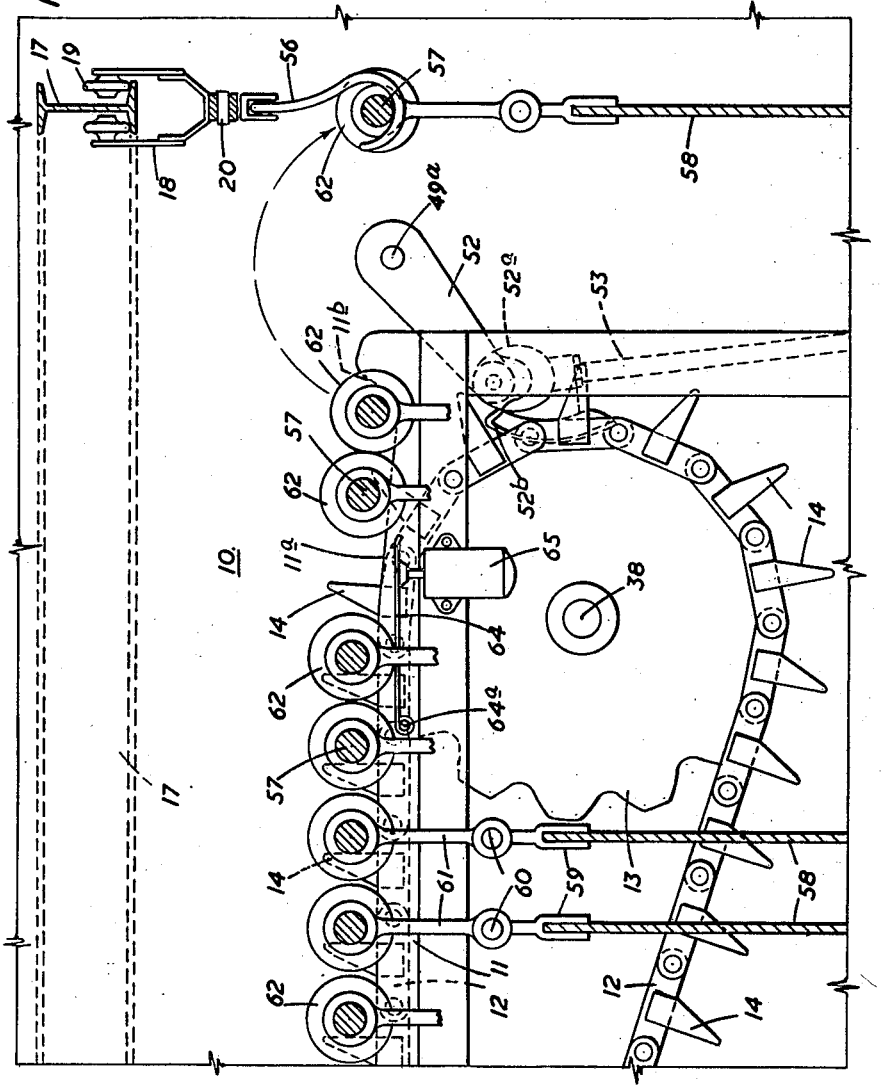
Fig. 10 is a part longitudinal section of the apparatus, showing details of the panel transfer means at the unloading end of the drying chamber.

Transfer arms 52 are arranged to make one revolution in the time taken for the loaded panels to move through chamber 10 a distance equal to the spacing between said panels, and the angular position of said arms 52 on stub shafts 49, 49ª is such that, as each panel reaches the take-off position, cups 52ª of said arms engage with the ends of the adjacent panel suspension bar 57, and as said arms 52 continue to revolve, the panel is lifted—the load being in part counterbalanced by weights 55—clear of tracks 11, as indicated by broken line in line Fig. 10, for transference to a pair of hooks 56 of runway 17; it being arranged—through disengagement of clutches 41 by the means hereinafter described—for external runway chain 20 to be stationary with a pair of hooks 56 suitably positioned whilst the transfer operation is carried out. During the lifting of each panel 58 from tracks 11, channelled spacing attachments 52ᵇ secured to cups 52ª engage the runners 62 of the following panel and retard their run to take-off position. When the transfer is complete, clutches 41 are re-engaged, chain 20 commences to move, and the transferred panel moves out of drying chamber 10 and commences its journey towards the loading end of the drying chamber. Runway chain 20 again becomes stationary with another pair of hooks 56 in position to receive the suspension bar 57 of the panel transferred from track 11 by the next revolution of transfer arms 52, and whilst this transfer operation is taking place the stripping of dry skins from the preceding panel is effected by hand. The chain 20 again starts up and stops with a third pair of hooks 56 in position to receive a loaded panel from chamber 10, and during this stopping period dry skins are stripped from the second-mentioned panel whilst the first mentioned panel—which has, in the meantime, passed through a conventional or other washing machine 66 (Fig. 1)—is being manually re-loaded with wet skins in known manner.

Each time external conveyor chain 20 stops, a re-loaded panel is positioned at the loading end of chamber 10 for transfer from hooks 56 onto tracks 11 by the adjacent transfer arms 52 which are rotating in unison with the arms 52 at the unloading end of the chamber, and thus each time a panel loaded with dried skins is transferred from tracks 11 to the external runway 17, a panel re-loaded with wet skins is simultaneously transferred from external runway 17, onto tracks 11 to commence its journey through drying chamber 10.

It will be seen that at all times during normal operation of the apparatus, chamber 10 will be full of loaded panels which are in continuous movement therethrough, and that at any given stopping period of the external conveyor chain 20 there will be (a) one panel in the process of being transferred from runway 17 to tracks 11; (b) one panel being transferred from tracks 11 onto runway 17; (c) one panel (having just emerged from chamber 10) being stripped of its dry skins preparatory to its passing through a washer 66 on the next starting up of the chain 20; (d) one or more panels, according to the length of the drying chamber, in positions where wet skins may be attached thereto; and (e) one re-loaded panel waiting to enter chamber 10.

Figure 11:
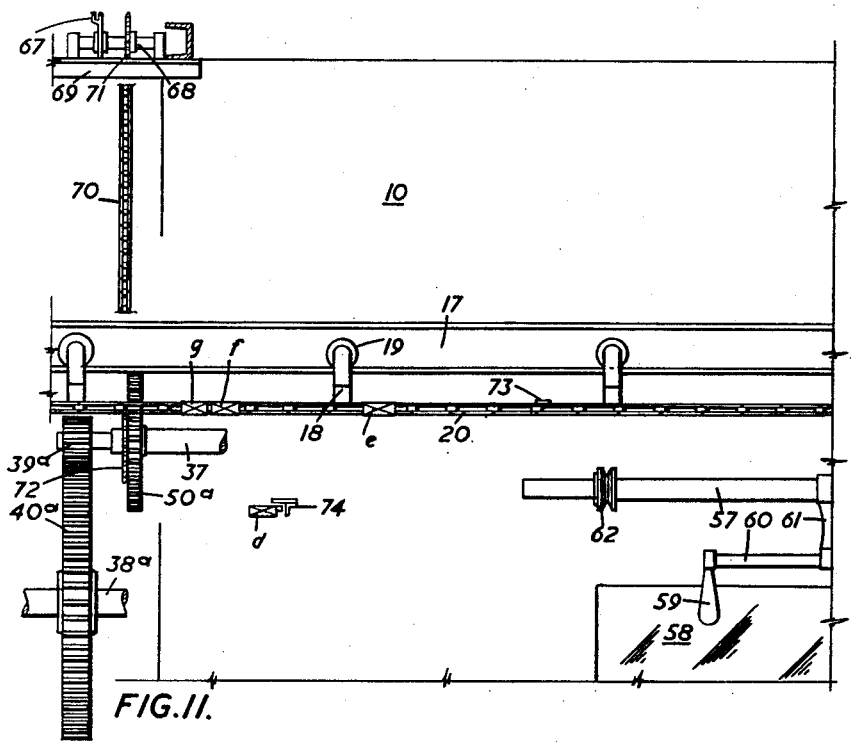
Fig. 11 is a diagrammatic view showing the switching arrangement at the loading end of the drying chamber.
Figure 13:
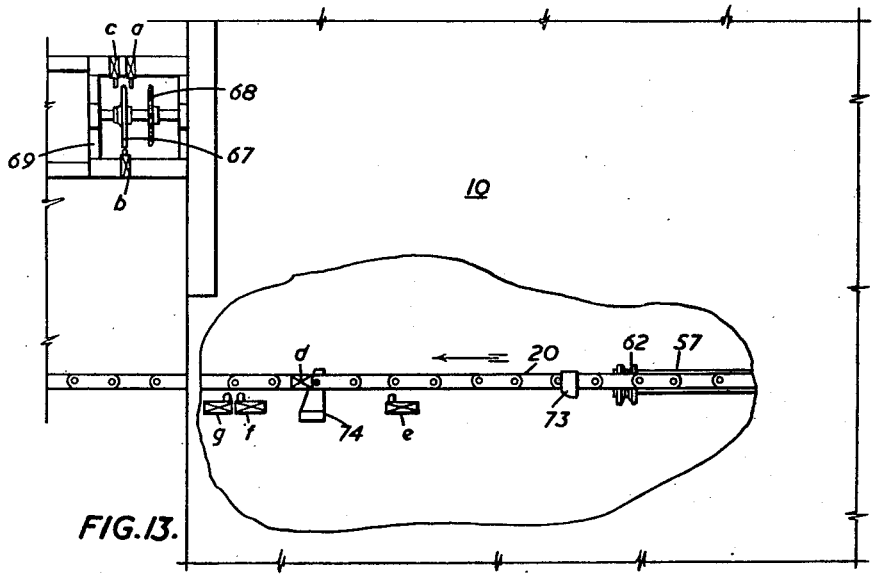
Fig. 13 is a plan view of Fig. 11.
Figure 12:
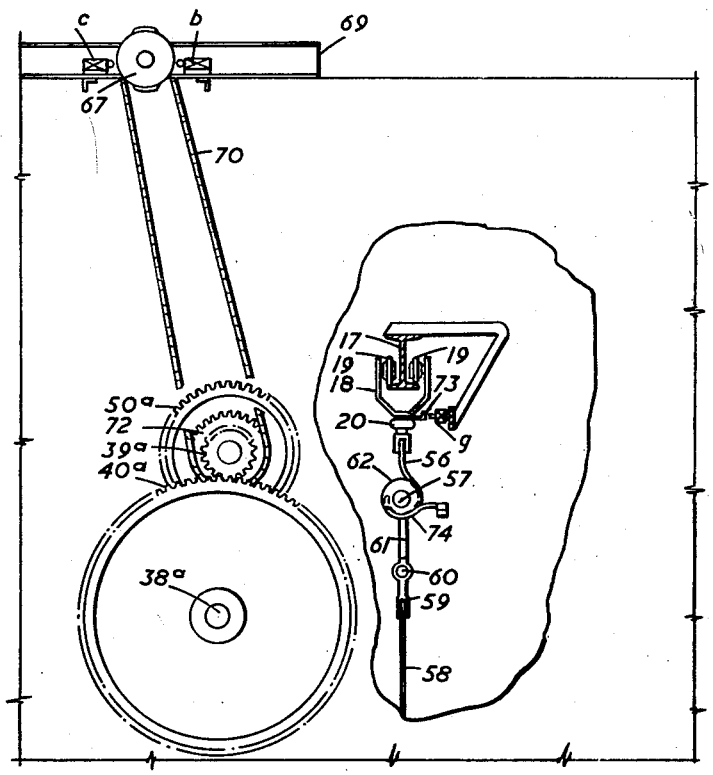
Fig. 12 is a view taken at right angles to Fig. 11.

Referring now to the means whereby is effected controlled stopping and starting of conveyor chain 20, this is achieved with the aid of appropriate electrical circuits and a number of electrical switches controlling same, the dispositions of said switches being diagrammatically illustrated in Figs. 11, 12 and 13. Three of said switches a, b and c are adapted for actuation by a cam 67 which is rotated continuously with and at the same speed as the transfer arms 52, and the remaining switches, d, e, f and g are controlled by the movement of the external conveyor chain 20.

Said cam 67 is mounted on a shaft 68 journalled in a bracket frame 69 adjacent (in this instance) to the top of chamber 10, and shaft 68 is driven from shaft 37 by means of a driving chain 70 running on a sprocket 71 of shaft 68 and a sprocket 72 of shaft 37.

Switches e, f and g are actuated by direct contact with projections or tappets 73, one of which latter is secured to chain 20 somewhat in advance—with relation to the direction of movement of chain 20—of each pair of hooks 56; and switch d is actuated by a spring loaded stopplate 74 which is normally positioned in the path (see more particularly Fig. 12) of runners 62.

The functions of the various switches are as follows:

Switch a causes a reduction in speed of motor 26 (if it is running above minimum speed) prior to the starting up of external conveyor chain 20.

Switch b starts up conveyor chain 20 by completing an electrical circuit which energises clutches 41.

Switches c and d work in conjunction with each other and closure of either or both will maintain the circuit of the main electricity supply to motor 26; thus, when switch c is open switch d must be closed, and vice versa, otherwise motor 26 stops and the whole apparatus becomes stationary.

Switch e reduces the speed of motor 26 (if it is running above minimum speed) prior to conveyor chain 20 stopping.

Switch f stops conveyor chain 20 by causing de-energisation of clutches 41.

Switch g is a safety switch which stops motor 26, and so the whole apparatus, in the event of switch f failing to operate.

Considering a typical cycle of events commencing with a panel 58 just entering chamber 10, for example as illustrated in Fig. 11, a tappet 73 first contacts switch e and, by reducing i. e. short circuiting the resistance in the motor's field circuit slows down the speed of motor 26 and thus the rate of movement of the whole apparatus, and said panel 58 arrives in position for transfer to tracks 11 at slow speed, whereupon tappet 73 contacts switch $f$, clutches 41 are de-energised, and conveyor chain 20 stops.

Switch $f$ is double acting and also causes motor 26 to accelerate to normal working speed. In the meantime, the adjacent runner 62 of the panel suspension bar 57 has contacted stop-plate 74 and switch $d$ is closed. Immediately after the instant when closure of switch $d$ should occur, switch $c$ is opened by cam 67 so that, if a panel is misplaced on carrier hooks 56 for any reason and is not in a position to be picked up by transfer arms 52, the consequent failure of switch $d$ to close causes stoppage of the whole apparatus and consequently damage is avoided. When panel 58 is lifted clear of hooks 56, stop-plate 74 returns under the influence of its spring loading to normal position and switch $d$ is opened, whilst switch $c$ closes to maintain the motor circuit.

When the panel in question has been transferred onto track rails 11 of chamber 10 (and a panel has simultaneously been transferred onto runway 17 from the unloading end of chamber 10) switch $a$, actuated by cam 67, reduces the motor speed, switch $b$ energises clutches 41 to start up conveyor chain 20, and thereafter causes acceleration of the motor to normal running speed by means of suitable automatic control apparatus as formerly. The contacts of an electrical relay (not shown) short out switch $g$ whilst tappet 73 passes over same in normal running.

Figure 2:
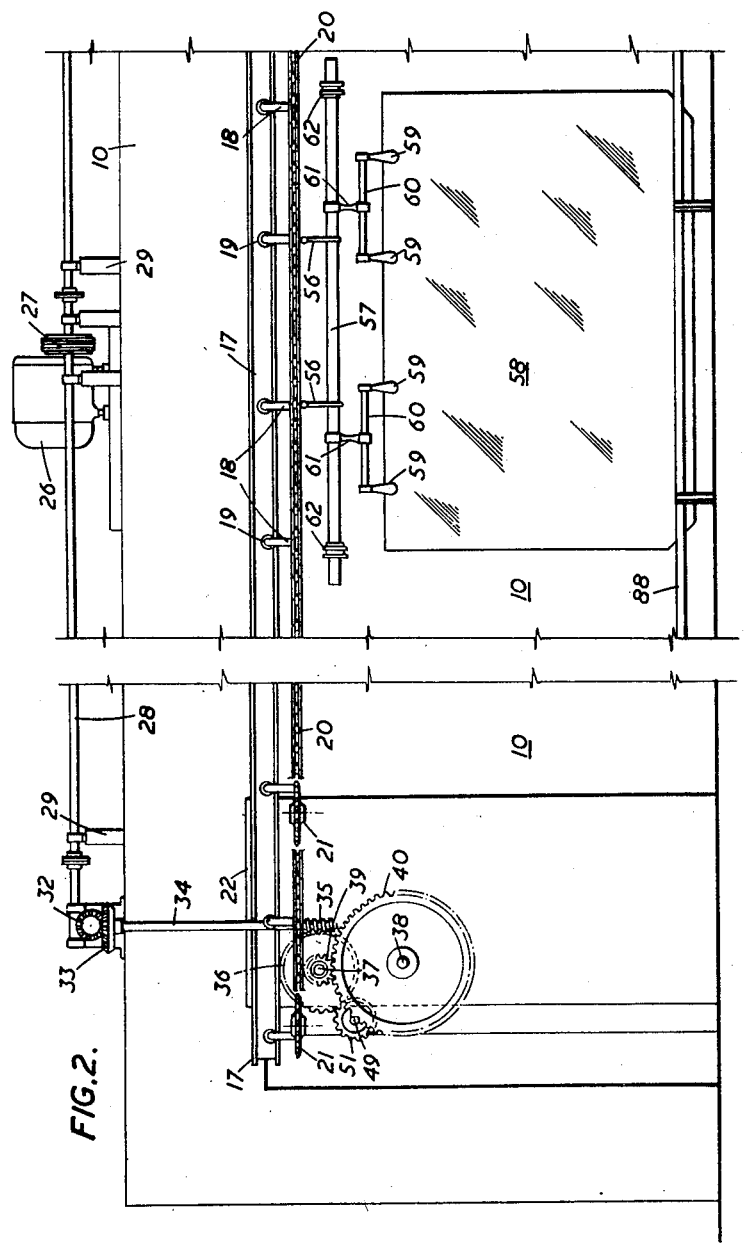
Fig. 2 is a front elevation of the loading end of the apparatus.

In order to conserve the supply of hot air introduced into chamber 10, the door apertures at the loading and unloading ends of chamber 10 are as narrow as possible commensurate with the safe entry and exit into and out of said chambers of panels 58, for example as indicated at 10a Fig. 2; but, in order to enhance the efficiency of the apparatus, sliding doors are preferably fitted at each end of the chamber which doors open and close automatically to permit entry and exit of the panels. In Figs. 7, 8 and 9 which illustrate a convenient method of achieving this end, 75 indicates the door at the unloading end of the drying chamber 10 (the door at the loading end being similarly constructed and operated) which is slidable to closed and open positions on a track 75a.

Mounted on a framework 76 in bearing plates 76a, and just above door 75, is a vertical shaft 77 which carries at its lower end a sprocket 78 disposed so as to be in operative engagement with conveyor chain 20 as it passes through the end of chamber 10. A spur pinion 79 keyed to shaft 77 just below frame 76 is in mesh with a spur gear 80 which has formed in its upper face a cam slot 81, and engaged within said cam slot 81 is a follower 82 secured medially to a lever 83 pivotted at 83a and carrying at its outer end a toothed quadrant 83b. The latter meshes with a pinion 84 keyed to a shaft 85 which also carries a rack wheel 86, and the latter is operatively engaged with a rack 87 secured to the upper part of sliding door 75.

It is arranged for spur gear 80 to make one complete revolution during each period that the conveyor chain 20 is in motion, and the contouring of cam slot 81 is such that, through the movement of quadrant 83, door 75 opens to permit a panel 58 to emerge from chamber 10 and shuts immediately said panel is clear of the door opening. In similar manner, the door at the loading end of chamber 10 is arranged to open just prior to a panel commencing to enter the chamber, and to shut immediately it is inside.

Hardwood or other fenders or guides 88 (Fig. 2) are provided to engage the lower edges of panels 58 during their external run, and thus prevent untoward swinging of same during the pasting on of wet skins.

The referred to washer 66 includes water sprays (preferably hot) and revolving brushes for both sides of a panel, the water supply being controlled by the movement of conveyor chain 20.

Any suitable power unit or units other than that described may be employed to operate the apparatus, and any system of transmission gearing may be employed to achieve the required conveyor speeds and timing.

Means for altering the speeds of the internal and external conveyors may also be provided whereby loading and transfer times can be readily varied.

What we claim as our invention and desire to secure by Letters Patent is:

1. Drying apparatus comprising in combination an enclosed drying chamber having opposite loading and unloading openings communicating therewith, a plurality of panels upon which articles to be dried are carried, a conveyor mounted within said chamber whereby said panels may be continuously conveyed from the loading to the unloading openings of said chamber, a second conveyor for conveying said panels externally of the chamber from the unloading opening to the loading opening of said chamber, means whereby said second conveyor may pass through the loading and unloading openings of said chamber, means for automatically transferring said panels individually to and from said conveyors, and means for transmitting an intermittent motion to said second conveyor whereby the latter may remain at rest during the individual transfer of said panels to and from said conveyor; said apparatus being operable by an electric motor which is arranged to drive a transmission shaft disposed longitudinally above the drying chamber, each end of said shaft being coupled through reduction gearing to a cross shaft, one end of each cross shaft driving said first conveyor and the panel transfer means, and the other end of each cross shaft driving the second conveyor through a clutch of electro-magnetic type energization of which to start up said second conveyor is effected by means of an electric switch operable by a cam arranged to move in synchronism with said panel transfer means.

2. Drying apparatus as claimed in claim 1 wherein de-energisation of said electro-magnetic clutch to stop said second conveyor is effected by an electric switch operable by a tappet projection of said second conveyor each time a panel arrives in correct position for transfer from said second conveyor to said first conveyor.

3. Drying apparatus as claimed in claim 1 wherein de-energisation of said electro-magnetic clutch to stop said second conveyor is effected by an electric switch operable by a tappet projection of said second conveyor each time a panel arrives in correct position for transfer from said second conveyor to said first conveyor, and wherein is included means for reducing the speed of said motor prior to each stopping of said second conveyor, means for increasing the speed of said motor after stopping said second conveyor, means whereby the speed is reduced prior to each starting up of said second conveyor, and means for increasing the speed after starting up of said second conveyor.

4. Apparatus for the drying of leather, hides, skins and the like, comprising a drying chamber, a pair of track rails, a conveyor adapted for continuous movement through said drying chamber, an endless chain with horn attachments at regular intervals in respect of each track rail included in said conveyor, a plurality of panels for carrying skins to be dried, a suspension bar for each panel, runners whereby said suspension bars are supportable on said track rails, a second conveyor external to said drying chamber in its longitudinal run but passing transversely through each end of said chamber, an endless chain included in said second conveyor adapted for automatically controlled intermittent movement, spaced carrier hooks fitted to said endless chain of said second conveyor for engaging said panel suspension bars, a pair of transfer arms spaced apart and rotatable at required speed at one end of the chamber, cup members provided at the outer ends of said arms for engaging the ends of the panels suspension bars in their path and automatically transferring panels carrying dried skins from the internal to the external conveyor, and a similar pair of transfer arms at the other end of said drying chamber for automatically transferring from the external to the internal conveyor panels which have been stripped of dried skins and loaded with wet skins; said apparatus being operable by an electric motor which is arranged to drive a transmission shaft disposed longitudinally above the drying chamber, each end of said shaft being coupled through reduction gearing to a cross-shaft, one end of each cross shaft driving the endless chains of the internal conveyor and the transfer arms, and the other end of each cross shaft driving the external conveyor chain through a clutch of electric-magnetic type energization of which to start up said external conveyor chain is effected by means of an electric switch operable by a cam arranged to rotate at the same speed as said transfer arms.

5. Apparatus for the drying of leather, hides, skins and the like, as claimed in claim 4, wherein de-energisation of said clutches to stop the external conveyor chain is effected by an electric switch operable by a tappet projection of the external runway chain each time a panel arrives in correct position for transfer from the external conveyor to the internal conveyor.

6. Apparatus for the drying of leather, hides, skins and the like, as claimed in claim 4, wherein de-energisation of said clutches to stop the external conveyor chain is effected by an electric switch operable by tappet projections of the external runway chain, and wherein is included means for reducing the speed of said motor prior to each stopping of the external conveyor chain, means for increasing the speed of said motor to normal after stopping of said external conveyor chain, means whereby the speed of said motor is reduced prior to each starting up of the external conveyor chain, and means for increasing the speed to normal after starting up of said conveyor chain.

7. Apparatus for the drying of leather, hides, skins and the like, as claimed in claim 4, wherein de-energisation of said clutches to stop the external conveyor chain is effected by an electric switch operable by tappet projections of the external runway chain; and wherein is included an electric switch operable by a tappet projection of the runway chain whereby the speed of the electric motor is reduced prior to stopping of the external conveyor chain, an electric switch whereby the speed of the motor is increased to normal after the stoppage of said conveyor chain, an electric switch operable by said cam whereby the speed of the motor is reduced prior to each starting up of said conveyor chain and whereby the speed of the motor is increased to normal after starting of said conveyor chain.

8. Apparatus for the drying of leather, hides, skins and the like, as claimed in claim 4, wherein de-energisation of said clutches to stop the external conveyor chain is effected by an electric switch operable by tappet projections of the external conveyor chain; and wherein is included an electric switch operable by a tappet projection of the external conveyor chain whereby the speed of the electric motor is reduced prior to stopping of the external conveyor chain, an electric switch whereby the speed of the motor is increased to normal after the stoppage of said conveyor chain, an electric switch operable by said cam whereby the speed of the motor is reduced prior to each starting up of said conveyor chain and whereby the speed of the motor is increased to normal after starting of said conveyor chain, an electric switch adapted to be closed through the movement of a spring loaded stop plate which is contacted by the runner of a panel suspension bar when the latter is in correct position for take off by the transfer arm, an electric switch adapted to be maintained open by said rotating cam during the time said last mentioned switch is normally closed and either one of said last two switches when closed being capable of maintaining the main power circuit of the electric motor closed.

9. Apparatus for the drying of leather, hides, skins and the like, as claimed in claim 4, wherein de-energisation of said clutches to stop said external conveyor chain is effected by an electric switch operable by tappet projections of the external conveyor chain, and wherein is included means for reducing the speed of the motor prior to each starting and stopping of the external conveyor chain, means for increasing the speed of said motor to normal after each starting and stopping of the external conveyor chain, a safety switch operable by tappets of the external chain whereby said motor is stopped in the event of said external conveyor chain failing to stop in correct position for panels to be transferred from one conveyor to the other, and a switch whereby said safety switch is rendered inoperative during normal operation of said external conveyor.

10. Drying apparatus comprising in combination an enclosed drying chamber having opposite loading and unloading openings communicating therewith, a sliding door for each opening of said drying chamber, a plurality of panels upon which articles to be dried are carried, a conveyor mounted within said chamber whereby said panels may be continuously conveyed from the loading to the unloading openings of said chamber, a second conveyor for conveying said panels externally of the chamber from the unloading opening to the loading opening of said chamber, means for automatically transferring said panels individually to and from said conveyors, means for transmitting an intermittent motion to said second conveyor whereby the latter may remain at rest during the individual transfer of said panels to and from said conveyor, and means operable by said second conveyor whereby the sliding doors may be opened and closed to permit entry and exit of said panels to and from said drying chamber; said apparatus being operable by an electric motor which is arranged to drive a transmission shaft disposed longitudinally above the drying chamber, each end of said shaft being coupled through reduction gearing to a cross shaft, one end of each cross shaft driving said first conveyor and the panel transfer means, and the other end of each cross shaft driving the second conveyor through a clutch of electro-magnetic type, energisation of which to start up said second conveyor is effected by means of an electric switch operable by a cam arranged to move in synchronism with said panel transfer means.

JOHN CHARLES TUSTING.
GEORGE OVERSTALL.

References Cited in the file of this patent
UNITED STATES PATENTS

| Number | Name | Date |
| --- | --- | --- |
| 1,566,899 | Wigglesworth | Dec. 22, 1925 |
| 1,676,911 | McDavitt | July 10, 1928 |
| 1,830,359 | Hamel | Nov. 3, 1931 |
| 1,837,605 | Baker | Dec. 22, 1931 |
| 2,103,901 | Gordon | Dec. 28, 1937 |
| 2,488,907 | Griffin et al. | Nov. 22, 1949 |